United States Patent Office 3,300,670
Patented Jan. 24, 1967

3,300,670
LUMINESCENT GLASS ARTICLES AND METHOD
FOR FORMING SAME
Frank Veres, Toledo, Ohio, assignor to Owens-Illinois,
Inc., a corporation of Ohio
No Drawing. Filed Feb. 28, 1962, Ser. No. 176,412
10 Claims. (Cl. 313—92)

The present invention relates generally to luminescent glasses or glasses which when subjected to the influence of irradiation, activation, or energization, undergo luminescence, and more particularly to glasses in the nature of which luminescence is derived from an in situ surface formation of transparent or semitransparent phosphor crystals which when subjected to the influence of energizing irradiation or activation emit luminescent radiation or spectral radiation in excess of the spectral radiation attributable to the thermal energy of the glass, and including the method of preparation of such glasses and articles made thereform.

In the past luminescent phosphors have been successfully utilized for various commercial applications such as, among others, X-ray, fluoroscope and intensifier screens, luminous markers, dials and indicators, screens for oscilloscopes, television picture tubes, radar tubes, "snooperscopes," electron microscopes, luminous or fluorescent lighting and radiation detection and measurement devices. However, since in their most common form these phosphors consist of tiny solid crystals, or aggregates of such crystals, ordinarily having an approximate particle size range from about 1 to 10 microns, in order to utilize the phosphor crystals for such commercial applications it becomes necessary to deposit the crystals onto a suitable transparent foundation or substrate, preferably glass, in the form of a thin layer, or coating, to produce a phosphor "screen." Several methods, such as decantation, vaporization and silk screening, among other well known methods, have been commonly employed for such purposes. However, certain objectionable deficiencies accompanying or resulting from the use of such methods have been found to be obviated by the present invention. Some of the more prominent deficiencies are hereinafter described. For example, during the conventional process of deposition of these phosphors upon the intended foundation, or substrate, which, as mentioned, is most commonly a transparent glass face plate, or viewing plate, the phosphor particles tend to agglomerate and produce a non-uniform layer or screen. Furthermore, the individual phosphor particles composing the deposited layer, or screen, are usually loosely packed and afford only limited optical contact with one another, or with the substrate upon which they are deposited. As a consequence, the effffective luminescent light output is greatly reduced due to a scattering and reflection of the emitted light resulting from the high incidence of interfacial light interference which occurs during impingement of the emitted light upon the irregularly disposed surfaces of a myriad of loosely stacked and randomly arranged phosphor particles. Further reduction in the luminescent light output is caused by variations in the refractive indices of the phosphor, the foundation, or substrate, and the medium occupying the voids situated between the phosphor particles. These voids are frequently occupied by adhesive binders used to retain the phosphor on the substrate, or in many instances are unfilled and remain empty.

In the application of phosphor screens to image projection tubes, such as television picture tubes, X-ray fluoroscopes, oscilloscopes, and the like wherein sharp light contrast and good resolution are extremely important, such light scattering and reflection are particularly undesirable. Furthermore, the vast surface exposure of conventional phosphor screens and the chemical instability of most of the binders ordinarily used to retain the phosphor particles on the substrate effect a considerable reduction of the chemical durability of conventional phosphor screens, and thus prevent the utilization of such screens in the many instances where resistance to various types of chemical attack is a requisite feature.

Another restriction upon the utility of phosphor screens fabricated by conventional methods, such as those mentioned above, is occasioned by the inherent lack of mechanical durability of such screens and the tendency of the phosphor particles to become dislodged from the substrate upon which they are deposited. As a consequence of the imperfect bonding of the phosphor particles, either to each other, or to the substrate, the phosphor screen, itself, frequently constitutes a source of objectionable contamination in systems where a high degree of purity is essential. In instances where it is desirable to employ an aluminized phosphor screen, for example in television picture tubes, the irregular surface contour of the particulate loosely packed phosphor particles makes it impossible to aluminize directly over the phosphor and requires that a delicate, expensive aluminizing process be followed whereby a thin lacquer membrane is stretched over the phosphor particles to provide the requisite smooth surface layer which is capable of being aluminized. Subsequently, the lacquer membrane is burned out, thereby leaving a resultant film of aluminum loosely disposed over the phosphor screen.

The loose random phosphor packing, described above, is also particularly undesirable for use in electron discharge devices utilizing cathodoluminescent phosphor screens where the use of high current densities is required. For example, although it is known that the light output of cathodoluminescent phosphors, of the type utilized in forming phosphor screens for cathode ray tubes, can be increased by increasing the voltage and/or current of the electron bombardment, the energy level of such bombardment in the case of phosphor screens applied by conventional decantation, vacuum evaporation, dusting, and other surface deposition techniques must be maintained at a level appreciably below that which the phosphor is intrinsically capable of withstanding. These lower energy levels are necessary in order to avoid rapid and excessive deterioration of the phosphor attendant with other objectionable consequences such as screen burn, phosphor flaking, current saturation and rapid diminution of luminescent output. The variation between the intrinsic energy level and the much lower energy level of these phosphors which must be used in order to avoid deterioration is believed to result from the insulated character of the phosphor particles arising from the loose and random packing of the particles within the confines of the vacuumized tube in which they are deposited and their consequent inability to effectively dissipate heat either by conduction or convection. Thus, since the individual phosphor particles tend to heat-up and overheat when bombarded with electrons, increases in power input tend to increasingly heat the phosphor screen until it burns and is permanently damaged, or is caused to undergo a rapid deterioration and an attendant diminution in light output.

In addition to the detrimental effects accompanying conventional screening techniques, other deleterious effects are ordinarily produced during the preparation and synthesis of the particulate phosphor materials. As is well known, the preparation and synthesis of phosphor crystals entails the use of high temperature solid state reactions of finely divided reactants. The phosphors produced by such methods, however, tend to aggregate on formation and are separated by various physical means, such as milling, grinding, or by chemical means. These separation methods, although necessary, have an adverse effect on the efficiency and light output of the phosphor.

In attempting to overcome many of the objectionable characteristics and deficiencies accompanying the use of substrate screening methods such as those briefly described above, prior art methods have been developed wherein the phosphor is intimately blended by mechanical mixing techniques, or by hand, in a low melting glass "frit" composition followed by melting and fusion of the blended phosphor and frit composition. In certain limited applications, these frit-phosphor blends produce a glass which envelopes and is intimately associated with the luminescent phosphor particles. In such instances the objective is to obtain a fused mixture in which the glass functions as the dielectric and provides a protective matrix in surrounding intimate physical and optical contact with the phosphor particles. However, it has been found that during the frit-phosphor fusion process, the phosphor is subjected to chemical attack and thermal degradation which poisons or adversely affects the luminescent properties of the phosphor. Additionally, it has been found that such frit-fusion processes give rise to the formation of a glassy body characterized by a seedy or vesicular internal structure which, like the loosely packed surface phosphor screens prepared according to the more common methods previously described, causes excessive and objectionable scattering, reflection and distortion of the emitted luminescent light.

Attempts to alleviate the numerous detrimental and deleterious effects occasioned with the use of methods of the foregoing type have given rise to a variety of different and more highly refined processing techniques. One such technique involves generally the concept of forming a luminescent glass by synthesizing luminescent phosphors in a crystalline or micro-crystalline form within an enveloping vitreous body such as glass to thereby form a luminescent system of phosphor and glass. In the practice of such concepts, the phosphor forming constituents and the glass forming ingredients are admixed, melted, and solidified in the form of a composite vitreous solution containing both the phosphor forming and the glass forming constituents. Reheating of the solidified glass at an appropriate devitrification temperature selected to correspond to the devitrification temperature of the phosphor produces selective crystallization of the phosphor within the glass and in such manner that the phosphor crystals are formed in bulk throughout the glass. Such a technique is disclosed in U.S. Patent No. 2,219,895 wherein it is disclosed that a zinc silicate phosphor may be segregated into crystalline or microcrystalline form from a glass having luminescent materials present therein to produce a translucent luminescent glass. Methods of this type afford many advantages over the previously described methods since the phosphor is initially formed within an enveloping parent body of glass which is in intimate optical and physical contact with the individual phosphor particles. Also, the phosphor particles are protectively anchored within the glass and need not be subjected to further damaging processing or contamination since the composite glass-phosphor body itself forms a luminescent screen and the need for depositing the phosphor particles upon a suitable substrate is thereby eliminated. Since the phosphor crystals are distributed throughout the parent body of glass, however, the transmission of luminous light through such a screen is precluded or severly restricted. This result obtains as a consequence of the extremely limited depth of glass penetration which can be achieved with various types of phosphor energizing rays, both electromagnetic and particle radiations such as ultraviolet rays, X-rays, cathode rays, alpha rays, beta rays, gamma rays and the like, and even protons, neutrons and deuterons, which serve to excite or irradiate the phosphor crystals contained within the glass. Consequently, it has been found that only those phosphor crystals situated in relatively close proximity to the surface of the luminescent glass (depending on the particular radiation) become sufficiently excited by such energizing media to emit appreciable light. Furthermore, since many types of devices, such as fluorescent lamps, television tubes, radar tubes, X-ray machines, among others, require that the luminescent light be transmitted through the non-activated or non-bombarded side or surface of the glass screen, it is obvious that the existence of the phosphor crystals situated within the glass at depths beyond the depth of penetration of the energizing rays or particles produce objectionable reflection and scattering of the emitted radiation and interfere with the sharp resolution and contrast desired in image projection devices. Additionally, it is a necessity in many of such devices, for reasons, among others, of safety, durability and commercial applicability, to utilize a glass phosphor screen of substantial thickness and consequently, such instances, the problems encountered in providing unimpeded luminescent light transmission, image resolution and the like become increasingly magnified.

One objective of the present invention is the provision of a luminescent glass body which is characterized by having luminescent phosphor crystals formed in situ on and within only marginal surface of the parent body of glass.

A further objective of the present invention is the provision of a luminescent glass body having the last mentioned characteristics and which additionally exhibits a high degree of transparency throughout the remaining portions of the parent glass.

A further objective of the present invention is the provision of a luminescent phosphor screen having improved properties.

Another objective of the present invention is the provision of a glass body or article having a luminescent layer having improved physical properties including enhanced mechanical strength, abrasion resistance and heat resistance.

Another objective of the present invention is the provision of a non-contaminating glass body or article having a luminescent layer having improved resistance to chemical attack.

Another objective of the invention is the provision of a glass body which generates electromagnetic radiations when irradiated with various types of primary energizing media. Such energizing media include both electromagnetic and particle radiations, including ultraviolet rays, X-rays, cathode rays, alpha rays, beta rays, gamma rays and the like, and even protons, neutrons and deuterons, etc.

Another objective of the present invention is the provision of a luminescent glass screen having a relatively smooth luminescent surface upon which a light reflecting and/or electrically conductive layer may be easily deposited with lasting permanency.

A still further objective of the present invention is the provision of glass bodies having a luminescent layer which will emit luminescent light when exposed to various forms of energizing irradiation.

A still further objective of the present invention is the provision of a glass body or article having an in situ crystalline phosphor sulfur area which will generate luminescent light when irradiated with various types of primary energizing media and having enhanced light transmittance characteristics to facilitate improved transmission of the luminescent light through the glass.

A still further objective of the present invention is the provision of a cathodoluminescent glass viewing screen, or face plate, which is capable of being bombarded or energized on at least one surface thereof to form a clearly discernible image which can be clearly viewed through an opposite non-bombarded, or non-energized surface, of the viewing screen.

A particular objective of the present invention is the provision of a surface luminescent glass body characterized by having a parent body of transparent glass, a constituent crystalline luminescent phosphor formation distributed in a glassy matrix derived from said parent glass and disposed only on and within the surface of said parent glass body, and said phosphor having a composition originating from the glass forming constituents comprised in said parent glass.

Accordingly, a particular objective of the present invention is the provision of a luminescent material having improved characteristics and which is capable of effectively obviating such objectionable and undesirable features as those described above.

Another principal objective of the present invention is the provision of an improved luminescent material exhibiting enhanced luminescent phosphor characteristics.

An additional objective of the present invention is the provision of new and useful glass bodies having luminescent phosphor crystals formed in situ within the glass.

Another objective of the present invention is the provision of new and useful phosphors formed by partial devitrification, or crystallization of a glassy body of material.

Another particular objective of this invention is the provision of new and improved method for accomplishing the foregoing objectives.

The specific nature of the present invention, as well as other objects and advantages thereof, will become apparent from the following detailed description in which, by way of example only, several preferred embodiments of this invention are described in specific detail.

In accordance with one basic concept of the present invention, there is provided a luminescent article comprising a non-luminescent vitreous layer and a luminescent crystalline outgrowth of said vitreous layer forming a luminescent surface layer on said article.

According to another principal concept of the present invention, there is provided a glass body having an integral surface layer comprising inorganic crystals, said crystals being formed by in situ crystallization from a surface portion of the glass of said body, said glass consisting essentially of inorganic constituents, said crystals of said layer being dispersed in a glassy matrix which consists essentially of the uncrystallized portion of said surface portion of glass of said body, said crystals in said integral surface layer containing an activator rendering said crystals luminescent.

Briefly, as herein provided, a glass body with a phosphor layer is made by forming within the matrix of a transparent glass body a layer of luminescent crystalline phosphor particles. The formation of the luminescent layer is accomplished by inducing a crystalline phosphor growth in the surface regions of the glass without destroying the transparency of the parent body of glass. Thus, there is achieved a vitreous or glassy body with a surface layer of luminescent crystals.

A selective restriction of the luminescent layer to the surface region of the glass is accomplished by initially preparing a suitable glass forming batch composition and thereafter melting and solidifying the same to a solid transparent glassy state according to methods well known in the art. The chemical formulations for various types of luminescent glasses exemplary of this invention are discussed subsequently in more particular detail. However, irrespective of the particular chemical formulation utilized, provided that the composition contains available constituents for the crystallization of a luminescent phosphor and is capable of forming a transparent glass when solidified, the solidified glass is subjected to a controlled heat treatment wherein the glass is exposed, under closely controlled conditions, to a temperature within a suitable temperature range. By regulation of the time-temperature relationship of such exposure, luminescent phosphor crystals are caused to be formed in situ and develop as a thin transparent or semi-transparent layer or stratum within the surface regions of the glass body dispersed in a glassy matrix and without effecting a devitrification or appreciable change in the transparency of the remaining portions of the glass body.

*Zinc silicate glasses*

One of the many types of glasses with which the present invention has been found to be particularly effective is a glass of the type which is broadly characterized as a zinc silicate glass. Such a glass may have a wide variation in composition as is well illustrated by particular examples shown below in Tables I-A through I-E and with which exceptionally good results were obtained.

TABLE I-A

| Constituent | Percent by Weight | | | | | | | |
|---|---|---|---|---|---|---|---|---|
| | A-1 | A-2 | B-1 | B-2 | C-1 | C-2 | D-1 | D-2 |
| $SiO_2$ | 42.60 | 38.1 | 39.9 | 39.4 | 44.9 | 45.0 | 45.6 | 60.1 |
| $ZnO$ | 48.40 | 47.6 | 49.8 | 49.9 | 40.4 | 40.3 | 41.0 | 32.6 |
| $MnO$ | 0.24 | 0.25 | 0.25 | 0.25 | 0.25 | 0.20 | 0.25 | 0.2 |
| $Na_2O$ | 1.90 | 4.80 | 5.00 | 4.00 | 2.00 | 2.00 | 2.00 | 2.5 |
| $NaF$ | | | | | | | | .5.0 |
| $Al_2O_3$ | 4.00 | 2.90 | | 2.50 | 2.50 | 4.00 | 2.50 | |
| $B_2O_3$ | | 6.70 | 5.00 | 4.00 | 1.50 | | | |
| $SrO$ | | | | | 7.00 | 7.00 | 7.10 | |
| $Li_2O$ | 1.90 | | | | 1.50 | 1.50 | 1.50 | |

TABLE I-B

| Constituent | Percent by Weight | | | | | | | |
|---|---|---|---|---|---|---|---|---|
| | E-1 | E-2 | F-1 | F-2 | G-1 | G-2 | H-1 | H-2 |
| $SiO_2$ | 63.40 | 59.4 | 59.4 | 54.9 | 54.8 | 54.8 | 54.8 | 54.8 |
| $ZnO$ | 27.90 | 27.9 | 26.4 | 26.4 | 26.4 | 24.4 | 24.4 | 24.4 |
| $MnO$ | 0.20 | 0.25 | 0.25 | 0.24 | 0.37 | 0.37 | 0.37 | 0.37 |
| $Na_2O$ | 3.50 | 3.50 | 5.00 | 5.00 | 4.98 | 5.00 | 5.00 | 5.00 |
| $NaF$ | 5.0 | 5.00 | 5.00 | 5.00 | 4.98 | 5.00 | 5.00 | 5.00 |
| $Al_2O_3$ | | 4.00 | 4.00 | 4.00 | 4.00 | 4.00 | | 4.00 |
| $BeO$ | | | | | | 6.50 | 6.50 | |
| $B_2O_3$ | | | | | | | 4.00 | |
| $SrO$ | | | | | | | | 6.50 |
| $SnO_2$ | | | | 4.50 | 4.50 | | | |

TABLE I-C

| Constituent | Percent by Weight | | | | | | | |
|---|---|---|---|---|---|---|---|---|
| | I-1 | I-2 | J-1 | J-2 | K-1 | K-2 | L-1 | L-2 |
| $SiO_2$ | 43.0 | 43.4 | 44.7 | 44.3 | 44.1 | 44.8 | 44.6 | 44.2 |
| $ZnO$ | 48.0 | 39.0 | 40.2 | 39.9 | 39.7 | 40.4 | 40.1 | 39.8 |
| $MnO$ | 0.2 | 0.7 | 0.7 | 1.5 | 1.9 | 0.5 | 1.0 | 1.7 |
| $Na_2O$ | 3.8 | 1.9 | 2.0 | 2.0 | 2.0 | 2.0 | 2.0 | 2.0 |
| $Al_2O_3$ | 4.8 | 3.9 | 4.0 | 3.9 | 3.9 | 4.0 | 4.0 | 3.9 |
| $SrO$ | | 6.8 | 7.0 | 6.9 | 6.9 | 7.0 | 7.0 | 6.9 |
| $SnO_2$ | | 2.9 | | | | | | |
| $Li_2O$ | | 1.5 | 1.5 | 1.5 | 1.5 | 1.5 | 1.5 | 1.5 |

TABLE I-D

| Constituent | Percent by Weight | | | | | | | |
|---|---|---|---|---|---|---|---|---|
| | M-1 | M-2 | N-1 | N-2 | O-1 | O-2 | P-1 | P-2 |
| $SiO_2$ | 45.3 | 44.9 | 45.0 | 45.0 | 65.0 | 60.0 | 59.8 | 68.5 |
| $ZnO$ | 43.3 | 40.4 | 40.5 | 40.5 | 25.0 | 25.0 | 23.0 | 26.4 |
| $MnO$ | 0.3 | 0.1 | 0.06 | 0.04 | 0.2 | 0.2 | 0.2 | 0.2 |
| $Na_2O$ | 2.0 | 2.0 | 2.0 | 2.0 | 5.0 | 10.0 | 9.2 | |
| $Al_2O_3$ | | 4.0 | 4.0 | 4.0 | | | | |
| $B_2O_3$ | | | | | | 5.0 | | |
| $SrO$ | 7.1 | 7.0 | 7.0 | 7.0 | | | | |
| $Li_2O$ | 2.0 | 1.5 | 1.5 | 1.5 | | | | 5.0 |
| $CaO$ | | | | | | | 8.0 | |

TABLE I-E

| Constituent | Percent by Weight | | | | |
|---|---|---|---|---|---|
| | Q-1 | Q-2 | R-1 | R-2 | S-1 |
| $SiO_2$ | 64.4 | 61.70 | 60.70 | 64.50 | 65.7 |
| ZnO | 24.6 | 27.40 | 23.60 | 21.40 | 29.2 |
| MnO | 1.1 | 0.25 | 0.20 | 0.25 | 0.25 |
| $Na_2O$ | 9.9 | | 7.00 | 11.70 | |
| BeO | | 1.80 | | 2.20 | 1.9 |
| $Li_2O$ | | 3.00 | | | 3.2 |
| PbO | | | 8.50 | | |
| $TiO_2$ | | 3.00 | | | |

The compositions thus shown in Tables I-A through I-E are therefore representative of zinc silicate glasses having variations in constituents of the order shown below in Table I-F.

TABLE I-F

| Constituent: | Percent by weight |
|---|---|
| $SiO_2$ | 38.1 to 68.5 |
| ZnO | 21.4 to 49.9 |
| MnO | .1 to 1.9 |
| $Na_2O$ | 0 to 11.7 |
| NaF | 0 to 5.0 |
| $Al_2O_3$ | 0 to 4.8 |
| $B_2O_3$ | 0 to 6.7 |
| $SnO_2$ | 0 to 4.5 |
| $Li_2O$ | 0 to 5.0 |
| BeO | 0 to 6.5 |
| SrO | 0 to 7.1 |
| CaO | 0 to 8.0 |
| PbO | 0 to 8.5 |
| $TiO_2$ | 0 to 3.0 |

The zinc silicate glasses prepared from the compositions shown above in Tables I-A through I-E after being surface crystallized became highly luminescent and compared very favorably with commercial zinc silicate phosphors. Commercial zinc silicate phosphors, as is well known in the art, possess extremely desirable characteristics, particularly with respect to durability and high visual luminescence. These characteristics are also exemplified by the in situ surface crystallized glasses having the compositions shown in the above tables and which formed a crystalline surface layer of luminescent willemite as identified by X-ray diffraction tests. By proper control of the thermal crystallization, or heat treatment, methods it has been possible to regulate the depth of the crystalline willemite surface formations to such an extent that high luminescence is obtained with crystalline or microcrystalline surface layers so thin that they are visibly transparent or semi-transparent.

Prior to the formation of crystalline surface luminescence, these glasses are highly transparent and have a slight pink coloration which is attributable to the presence of manganese which is believed to function as an activator. The pink tint, however, can be eliminated as was done in glass G-1 by the addition of suitable amounts of tin oxide which in effect acts to control the state of oxidation of the manganese ions present in the glass to an extent sufficient to eliminate the pink coloration. Composition C-2 which is considered to exhibit properties generally representative of the entire group of zinc silicate glasses shown above, begins to produce luminescent surface crystallization at approximately 1360° F. and the luminescence becomes progressively stronger up to temperatures of 1380° F. From 1360° F. to 1500° F. the color of luminescence is primarily yellow whereas temperatures in the range of about 1500° F. to 1620° F. produced a luminescent color which is primarily green. Comparative results also indicate that the phosphor crystals exhibiting primarily yellow luminescence have a relatively long afterglow, or decay time, whereas the persistence of afterglow for the crystals exhibiting green luminescence is relatively short. The surface crystallized glasses in Tables I-A through I-E are also characterized by the fact that they are excited to luminescence by daylight. This luminescence, although visibly weak, persists for an appreciable period of time and can be visually observed in a darkened environment by the dark-adapted eye. Positive measurement with a sensitive photomultiplier tube will register luminescent light emission even after the glass has been isolated from daylight and other sources of external activation for as long as 12 hours. It has also been found that these glasses possess excellent resistance to thermal shock.

*Calcium silicate glasses*

Another characteristic type of glass which was thermally crystallized to produce crystalline surface luminescence was a calcium silicate glass. Several calcium silicate glass compositions found to give especially good results are set forth in the following Tables II-A and II-B, whereas the range of variation in the constituents shown in these tables is represented in the following Table II-C.

TABLE II-A

| Constituent | Percent by Weight | | | | | | | |
|---|---|---|---|---|---|---|---|---|
| | A | B | C | D | E | F | G | H |
| $SiO_2$ | 55.0 | 65.3 | 63.7 | 60.5 | 52.8 | 66.7 | 71.5 | 66.5 |
| CaO | 32.4 | 21.3 | 24.2 | 22.9 | 30.7 | 24.8 | 23.3 | 24.8 |
| PbO | 7.4 | 6.1 | 6.2 | 5.6 | 5.0 | 1.0 | | 1.0 |
| MnO | 0.5 | 0.30 | 0.30 | 0.30 | 1.4 | 2.7 | 1.0 | 2.7 |
| NaO | 4.6 | 7.1 | | | 10.2 | 5.2 | | 5.2 |
| ZnO | | | 2.2 | | | | 2.0 | |
| $Li_2O$ | | | 3.9 | 3.8 | | | 5.3 | |
| $B_2O_3$ | | | | 5.0 | | | | |

TABLE II-B

| Constituent | Percent by Weight | | | | | | | |
|---|---|---|---|---|---|---|---|---|
| | I | J | K | L | M | N | O | P |
| $SiO_2$ | 69.8 | 60.3 | 48.2 | 48.4 | 53.3 | 64.7 | 53.9 | 48.5 |
| CaO | 19.6 | 22.6 | 39.6 | 36.5 | 28.5 | 26.8 | 40.0 | 45.3 |
| PbO | 1.0 | 2.5 | 7.3 | 7.3 | 8.0 | 8.0 | 0.9 | 0.9 |
| MnO | 2.9 | 2.5 | 0.5 | 0.5 | 0.5 | 0.5 | 0.6 | 0.6 |
| $Li_2O$ | 1.7 | 14.6 | | | | | | |
| MgO | 5.0 | | | 2.7 | 7.0 | | | |
| $Al_2O_3$ | | | 4.6 | 4.6 | 3.0 | | 5.0 | 4.7 |

TABLE II-C

| Constituent: | Percent by weight |
|---|---|
| $SiO_2$ | 48.2 to 71.5 |
| CaO | 19.6 to 45.3 |
| PbO | 0 to 8.0 |
| MnO | 0.30 to 2.9 |
| NaO | 0 to 10.2 |
| ZnO | 0 to 2.2 |
| $Li_2O$ | 0 to 14.6 |
| $B_2O_3$ | 0 to 5.0 |
| MgO | 0 to 7.0 |
| $Al_2O_3$ | 0 to 5.0 |

The calcium silicate glasses formed from the compositions shown in Tables II-A and II-B above, after being surface devitrified, produced a good visual surface luminescence. Each of the surface crystallized glasses formed from these compositions, with the exception of the glass formed from composition G, contained both manganese oxide and lead oxide activators and produced luminescent surface which emitted a warm yellow color of luminescence when exposed to various types of energizing excitation, including ultraviolet, X-ray and cathode ray excitation. By contrast, however, the surface crystallized glass formed from composition G, which contained only manganese oxide as an activator, luminesced with a blue color under similar excitation. These glasses, which are also commonly known as wollastonite glasses, also exhibited an unusually high degree of mechanical strength and impact resistance which, although presently not fully understood, are believed to result from the formation of compressive forces which are exerted upon the crystalline surface by the parent body of glass. Also, since considerable variation of the various batch constituents, as shown in Table II-C, is permissible without destroying the luminescent character of the surface crystals which are ultimately formed it is possible to advantageously vary many of the physical properties of the glass to those desired in the particular article which is to be made.

*Lead barium silicate glasses*

Lead barium silicate glasses formed from compositions such as those shown below in Tables III-A and III-B have also been prepared and surface crystallized to luminescence with good results. The variations in composition indicated in Tables III-A and III-B are set forth below in Table III-C.

TABLE III-A

| Constituents | Percent by Weight | | | | |
|---|---|---|---|---|---|
| | A | B | C | D | E |
| SiO₂ | 39.8 | 39.8 | 39.8 | 39.8 | 43.0 |
| PbO | 29.6 | 29.6 | 29.6 | 29.6 | 27.9 |
| BaO | 30.5 | 30.5 | 30.5 | 30.5 | 27.4 |
| MnO | | | | 0.25 | |
| Li₂O | | | | | 1.6 |
| Au | | 0.0013 | 0.027 | | |

TABLE III-B

| Constituents | Percent by Weight | | | | |
|---|---|---|---|---|---|
| | F | G | H | I | J |
| SiO₂ | 37.7 | 36.9 | 36.8 | 33.6 | 37.2 |
| PbO | 36.9 | 43.3 | 28.7 | 26.3 | 23.2 |
| BaO | 25.4 | 19.8 | 29.6 | 27.1 | 39.6 |
| Al₂O₃ | | | 4.9 | | |
| Sb₂O₃ | | | | 12.9 | |

TABLE III-C

| Constituent: | Percent by weight |
|---|---|
| SiO₂ | 33.6 to 43.0 |
| PbO | 23.2 to 43.3 |
| BaO | 19.8 to 39.6 |
| MnO | 0 to 0.25 |
| Li₂O | 0 to 1.6 |
| Al₂O₃ | 0 to 4.9 |
| Sb₂O₃ | 0 to 12.9 |
| Au | 0 to 0.027 |

Barium silicates containing large amounts of lead oxide as an activator are known to be good photoluminescent phosphors whose luminescence ranges in color from green to blue. The glass compositions shown in Table III-A and III-B consist essentially of oxides of lead, barium and silica. The glasses formed from these compositions were surface crystallized and produced a very high degree of luminescent brightness. Gold, used in compositions B and C was added to facilitate nucleation and crystal growth and its presence did not substantially alter the luminescent output representative of the surface crystallized glasses formed from the other compositions and particularly composition A.

Although all of these surface crystallized glasses produced good luminescence, it was observed that some diminishment of luminescence under exposure to ultraviolet rays occurred in compositions E, I and J which contained lower amounts of lead oxide than the other compositions. It is also particularly significant that the surface crystallized glasses having the compositions in Tables III-A and III-B emit luminescent light of a character extending throughout the visible spectrum. As such, these glasses are especially suitable for fluorescent lighting and other uses where a white light emitting phosphor or phosphor blend is necessary or desirable.

*Calcium tungstate glasses*

Compositions for the formation of a series of calcium tungstate glasses which developed exceedingly good luminescent surface crystallization according to the thermal heat treatment of this invention are tabulated below in Table IV and the variations in the constituents shown in Table IV are also set forth below in Table IV-A.

TABLE IV

| Constituents | Percent by Weight | | | | | | | | |
|---|---|---|---|---|---|---|---|---|---|
| | A | B | C | D | E | F | G | H | I |
| SiO₂ | 57.00 | 46.2 | 43.7 | 43.7 | 43.7 | 48.3 | 48.3 | 55.9 | 57.3 |
| Al₂O₃ | | 2.1 | 4.3 | 4.3 | 4.3 | 2.0 | | | |
| CaO | 24.60 | 33.4 | 35.0 | 35.0 | 35.0 | 29.5 | 29.5 | 24.3 | 25.0 |
| PbO | 1.15 | 4.3 | 5.6 | 4.6 | 3.6 | 2.0 | 4.0 | 1.1 | 1.2 |
| MgO | | 1.0 | | | | | 2.7 | 2.7 | |
| Na₂O | | | | | | | | 8.0 | |
| MnO | 1.06 | | | | | | | | |
| Li₂O | 5.50 | | | | | | | | 5.7 |
| WO₃ | 10.72 | 13.0 | 11.4 | 12.4 | 13.4 | 15.5 | 15.5 | 10.6 | 10.9 |

TABLE IV-A

| Constituent: | Percent by weight |
|---|---|
| SiO₂ | 43.7 to 57.3 |
| Al₂O₃ | 2.0 to 4.3 |
| CaO | 24.3 to 35.0 |
| PbO | 1.1 to 5.6 |
| MgO | 0 to 2.7 |
| Na₂O | 0 to 8.0 |
| MnO | 0 to 1.06 |
| Li₂O | 0 to 5.7 |
| WO₃ | 10.6 to 15.5 |

The surface crystallized glasses having the above compositions of Table IV, when energized with various types of activating irradiation, including irradiation by ultraviolet rays, X-rays and cathode rays, produced a bluish-white luminescence characterized by a relatively rapid rate of decay following termination of excitation. In these respects, it was observed that the color and decay characteristics of commercial calcium tungstate phosphors were quite similar.

Luminescent surface crystals developed with calcium tungstate glass compositions of this invention have been identified as scheelite (CaO·WO₃:Mn. and/or CaO·WO₃:Pb)

the manganese and lead, of course, functioning as activators, and being present in varying amounts according to the given glass composition above. Obviously, the luminescent scheelite surface crystals obtained with compositions other than A in Table IV did not contain manganese as an activator. In this regard it was also observed that no noticeable variation in luminescent color resulted from substitution or co-mingling of these two activators.

*Cadmium borate glasses*

Another series of glasses characteristically classified as cadmium borate glasses were also prepared and thermally crystallized to produce crystalline surface luminescence. Representative compositions for these glasses appear in Table V below together with the ranges of constituent variation which appear in Table V-A, also below.

TABLE V

| Constituents | Percent by Weight | | | | | | | |
|---|---|---|---|---|---|---|---|---|
| | A | B | C | D | E | F | G | H |
| SiO₂ | 9.90 | 4.90 | | | | 1.00 | | |
| Al₂O₃ | | | 3.00 | 3.00 | 5.00 | 2.00 | | |
| B₂O₃ | 28.10 | 30.40 | 31.00 | 29.00 | 29.00 | 29.00 | 31.80 | 39.90 |
| MnO | 0.25 | 0.25 | 0.25 | 0.25 | 0.25 | 0.25 | 0.25 | 0.25 |
| CdO | 61.80 | 64.50 | 65.80 | 68.00 | 65.80 | 68.00 | 67.80 | 59.80 |

TABLE V-A

| Constituent: | Percent by weight |
|---|---|
| $SiO_2$ | 0 to 9.90 |
| $Al_2O_3$ | 0 to 5.00 |
| $B_2O_3$ | 28.10 to 39.90 |
| MnO | 0.25 |
| CdO | 59.80 to 68.00 |

The glasses produced from the compositions of Table V above were processed in accordance with the glass surface crystallization methods of this invention and developed, as a consequence of such methods, extremely good surface luminescence. When excited by such energizing media as ultraviolet rays, cathode rays and the like these glasses emitted strong luminescence having a red coloration. Under excitation by X-rays, however, the color of luminescence visually appeared to be more in the nature of a pink to orange. These glasses were all relatively low melting glasses having melting ranges ranging between about 1800° F. and 2100° F. It is also significant that it was observed that the glass surface cadmium borate crystals produced strong luminescence under ultraviolet excitation at wave lengths of both 2537 Angstrom and 3600 Angstrom units. By contrast, so far as is known, the commercial cadmium borate phosphors are not suitable for luminescent purposes when exposed to ultraviolet wave lengths of 3600 Angstroms. The surface crystallized cadmium borate glasses of this invention have therefore been ascertained to be extremely suitable for use in various types of luminescent or fluorescent lighting devices since these glasses emit luminescent light when exposed to both the shorter and the longer wave lengths of ultraviolet excitation commonly generated within such lighting devices.

Another salient characteristic of surface crystallized cadmium borate glasses is that the color of luminescence can be suitably modified over a wide range by the formation of mixtures of cadmium borate and calcium tungstate surface crystals. Thus, greater adaptability of these glasses can be achieved. For example, surface crystallized glasses of this nature having luminescent cadmium borate crystals and what are authoritatively believed to be luminescent calcium tungstate crystals are subsequently discussed with greater particularity in relation to Table XI.

*Zinc borate glasses*

Zinc borate glasses are typical of another class of glasses with which the present invention may be practiced with good results. The constituents from which these glasses were prepared had melting temperatures in the range of about 1700° F. to 2000° F. and when so melted and subsequently solidified produced transparent glasses. The compositions for these glasses are set forth in Tables VI-A and VI-B, which follow, and the ranges for the constituents of the compositions in these tables are tabulated in Table VI-C, which also follows.

TABLE VI-A

| Constituent | Percent by Weight | | | | |
|---|---|---|---|---|---|
| | A | B | C | D | E |
| $SiO_2$ | | | | | 7.9 |
| $B_2O_3$ | 42.70 | 37.8 | 37.2 | 37.2 | 27.4 |
| ZnO | 57.00 | 50.5 | 49.5 | 49.5 | 64.2 |
| MnO | 0.46 | 1.6 | 1.6 | 1.6 | 0.3 |
| $Al_2O_3$ | | 6.1 | 6.1 | 6.1 | |
| PbO | | | 1.7 | | |
| $Na_2O$ | | | | 1.7 | |
| $F_2$ | | 7.1 | 6.8 | 6.8 | |
| ($O_2$ equivalent for $F_2$) | | −3.0 | −2.9 | −2.9 | |

TABLE VI-B

| Constituent | Percent by Weight | | | | |
|---|---|---|---|---|---|
| | F | G | H | I | J |
| $B_2O_3$ | 41.3 | 36.2 | 37.8 | 37.0 | 36.0 |
| ZnO | 55.0 | 50.2 | 52.5 | 51.3 | 50.0 |
| MnO | 1.6 | 0.7 | 0.7 | 0.7 | 0.7 |
| $Al_2O_3$ | | 13.0 | 9.0 | 11.0 | 10.7 |
| PbO | 2.0 | | | | |
| $SnO_2$ | | | | | 2.6 |

TABLE VI-C

| Constituent: | Percent by weight |
|---|---|
| $SiO_2$ | 0 to 7.9 |
| $B_2O_3$ | 27.4 to 42.7 |
| ZnO | 49.5 to 64.2 |
| MnO | 0.3 to 1.6 |
| $Al_2O_3$ | 0 to 13.0 |
| PbO | 0 to 2.0 |
| $Na_2O$ | 0 to 1.7 |
| $F_2$ | 0 to 7.1 |
| $SnO_2$ | 0 to 2.6 |

Surface crystallization procedure of the present invention carried out with zinc borate glasses having the above compositions developed a surface luminescence of high light output values. Furthermore, the luminescence was characteristic of various types of activating media representative of several energy levels and included activation by ultraviolet rays, cathode rays and X-rays.

Depending upon the particular time-temperature relationship employed during the thermal crystallization procedures of this invention, it was found that variations in the nature of the luminescent surface crystallinity could be obtained. For example, by suitable variations in the thermal crystallization procedures of this invention, surface crystallized glasses corresponding to composition B in Table VI-A above were formed with different types of luminescent surface crystals having manganese as an activator. In some instances the surface crystals, as identified by X-ray diffraction tests, were predominantly beta $ZnO \cdot B_2O_3$:MnO together with lesser amounts of $ZnO \cdot Al_2O_3$:MnO. In other instances the relative predominance of these surface crystals was reversed. In still other instances there existed a predominance of $5ZnO \cdot 2B_2O_3$:MnO. As an overall effect of such variability in luminescent surface crystallinity exceptionally good variation or modification of luminescent color is achieved since, for example, under exposure to ultraviolet rays $5ZnO \cdot B_2O_3$:Mn emits an orange color of luminescence, whereas $ZnO \cdot B_2O_3$:MnO and $ZnO \cdot Al_2O_3$ emit green luminescence. Such variability also appears to exist with other surface crystallized zinc borate glasses having compositions corresponding to those indicated in Tables VI-A and VI-B.

*Calcium phosphate glasses*

As a further example of the many types of suitable glasses of this invention, there is shown below in Table VII a series of compositions for the formation of calcium phosphate glasses with the composition ranges for these glasses being depicted in Table VII-A.

TABLE VII

| Constituent | Percent by Weight | | | | | | | |
|---|---|---|---|---|---|---|---|---|
| | A | B | C | D | E | F | G | H |
| $Al_2O_3$ | 3.65 | 1.0 | 3.7 | 3.6 | 3.5 | 23.0 | | |
| CaO | 23.70 | 26.5 | 33.7 | 43.9 | 23.0 | | | 25.6 |
| $P_2O_5$ | 71.70 | 71.5 | 61.7 | 51.7 | 73.0 | 73.0 | 49.0 | 5.7 |
| $Dy_2O_3$ | 0.30 | 0.3 | 0.3 | | | | | |
| MnO | | | | 0.8 | 0.6 | 0.6 | 0.6 | 0.5 |
| $SnO_2$ | | | | | | 1.0 | | |
| $CaF_2$ | | | | | | 3.0 | 49.0 | |
| $Sb_2O_3$ | | | | | | | 1.4 | 2.7 |
| $Na_2O$ | | | | | | | | 7.0 |
| $SiO_2$ | | | | | | | | 58.5 |

TABLE VII-A

| Constituent: | Percent by weight |
|---|---|
| $Al_2O_3$ | 0 to 23.0 |
| CaO | 0 to 43.9 |
| $P_2O_5$ | 5.7 to 73.0 |
| $CaF_2$ | 0 to 3.0 |
| $Na_2O$ | 0 to 7.0 |
| $Si_2O$ | 0 to 58.5 |
| One or more activators selected from group consisting of $Dy_2O_3$, MnO, $SnO_2$ and $Sb_2O_3$ | 0.3 to 3.2 |

In each instance surface crystallization of the counterpart glasses for the compositions shown above in Table VII produced luminescence. The surface crystallized glasses corresponding to compositions A, B and C having dysprosium therein as an activator were visibly weak in luminescent output when irradiated with relatively short wave length ultraviolet rays, but, by contrast, when irradiated with the longer wave length ultraviolet rays (3660 Angstroms) emitted a relatively strong luminescence having a yellow coloration.

The surface crystallized glasses corresponding to the remaining compositions D, E, F, G and H of Table VII, which were activated with tin, manganese and antimony, either separately or in combination, as shown, emitted good luminescence in the energy levels where compositions A and B were weak. Of these latter surface crystallized glasses, compositions G and H are extremely useful for many types of luminescent image projection screens and daylight types of lighting devices since they produce a warm white luminescent color.

Zinc vanadate glasses

In Table VIII below there is shown a representative composition for still another class of glasses, viz., zinc vanadate glasses, surface crystallized in accordance with this invention.

TABLE VIII

| Constituent: | Percent by weight |
|---|---|
| ZnO | 70.7 |
| $V_2O_5$ | 23.6 |
| $B_2O_3$ | 5.7 |

The glass composition of Table VIII was melted at 1950° F., and thereafter solidified to form a glass which was essentially black throughout. Surface crystallization was carried out by heat tempering the solidified glass at 1050° F. for 4.5 hours which resulted in the formation of a uniformly partially crystallized surface layer which produced luminescence when exposed to irradiation from both 2537 Angstrom and 3660 Angstrom ultraviolet light wave lengths. In both instances of irradiation the crystallized surface of the glass emitted yellow light.

Zinc aluminate glasses

Zinc aluminate glasses have also been found suitable for the present invention and two representative compositions for such glasses appear in Table IX, following:

TABLE IX

| Constituent | Percent by Weight | |
|---|---|---|
| | A | B |
| $Al_2O_3$ | 16.6 | 16.6 |
| $B_2O_3$ | 34.7 | 34.7 |
| ZnO | 48.2 | 33.2 |
| SrO | | 15.1 |
| MnO | 0.7 | 0.7 |

The luminescent surface crystals for the glasses having compositions A and B in Table IX were determined to be predominantly zinc aluminate crystals with some crystals of alpha $5ZnO \cdot 2B_2O_3$ being present as a secondary phase. Additionally, the surface crystallized glass of composition B was determined to also have beta $ZnO \cdot B_2O_3$ surface crystals present. In the latter composition the SrO remains in solid solution during the surface crystallization process.

The glasses formed from the above zinc aluminate compositions, when surface crystallized, were luminescent under exposure to ultraviolet light and X-ray excitation.

Diopside glasses

Exemplary glass compositions of the ternary system $CaO \cdot MgO \cdot 2SiO_2$, or diopside, suitable for the practice of this invention are tabulated below in Table X.

TABLE X

| Constituent | Percent by Weight | |
|---|---|---|
| | A | B |
| MgO | 14.0 | 18.0 |
| CaO | 24.0 | 25.0 |
| $SiO_2$ | 54.2 | 53.7 |
| $Al_2O_3$ | 4.9 | |
| $TiO_2$ | 3.0 | 3.0 |

Composition A, shown in Taple X, above, contains titania as an activator, and includes alumina which functions to inhibit crystallization of the glass during forming operations. This composition after being melted at about 2650° F., solidified to form a clear, colorless glass. Surface crystallization of the resultant glass, carried out in accordance with the thermal crystallization procedures of this invention at a temperature of 1700° F. for four hours, developed a highly transparent skin of luminescent surface crystals on the glass. These surface crystals, by X-ray diffraction examination, were identified as mixtures of diopside crystals and calcium aluminate ($CaO \cdot Al_2O_3$) crystals, the former being the predominant crystalline phase and the latter a minor phase.

Composition B in Table X, above, represents a glass composition corresponding to the composition of pure diopside having 3 percent titanium dioxide added as an activator. This composition after being melted at about 2750° F., as with composition A, also solidified to a transparent colorless glass. When surface crystallized at 1600° F. for four and one-half hours, in the manner of this invention, this glass also developed a crystalline surface skin of luminescent diopside crystals approximately 10 microns in thickness.

Although luminescence from ultraviolet excitation could not be visually perceived with the surface crystallized glasses corresponding to the compositions shown in Table X, a blue luminescence of very good intensity was obtained when these same surface crystallized glasses were subjected to excitation by cathode ray bombardment.

A cathode ray tube in the form of a television picture tube was prepared using a luminescent face plate fabricated from the surface crystallized glass. After the luminescent surface crystals of the face plate had a conductive coating applied thereover, the face plate was exposed to cathode ray bombardment and produced a very good image which was being telecast by a commercial network. Current density measurements taken at 25 kv. showed increasing luminescent light output attendant with increasing current density, with light output measurements being taken in the range of 53 microamperes per square inch through 133 microamperes per square inch.

Mixtures of glasses

White, or near white-emitting phosphors are obviously very useful and necessary in many applications. Heretofore the most common method of meeting this necessity has been to make phosphor screens with mixtures of two or more kinds of phosphor powders, each of which emits its own characteristic color of luminescence, so that the resultant light dispersion produces a color blend which approaches the desired shade of white. With the surface crystallized glasses of this invention, the development of mixtures of luminescent crystals has also been achieved in several instances and have been discussed with reference to the preceding glass compositions. Table XI below is typical of glass forming compositions that were developed to further exploit such achievements.

TABLE XI

| Constituent | Percent by Weight | | | |
| --- | --- | --- | --- | --- |
| | A | B | C | D |
| $SiO_2$ | 43.7 | 47.3 | 54.5 | |
| $Al_2O_3$ | 4.3 | | | |
| CaO | 35.0 | 37.1 | 15.0 | 1.2 |
| PbO | 6.6 | 0.9 | 10.0 | |
| $WO_3$ | 10.4 | 8.4 | | |
| MnO | | 2.8 | 0.25 | 0.25 |
| $Li_2O$ | | 3.5 | | |
| BaO | | | 20.6 | |
| $B_2O_3$ | | | | 30.2 |
| CdO | | | | 64.5 |
| $WO_3$ | | | | 3.9 |

Luminescent surface crystals formed from calcium silicate glasses of Table II developed a yellow luminescence, whereas a bluish-white surface luminescence was developed with calcium tungstate glasses having compositions shown in Table IV. By suitable combination of these calcium silicate and calcium tungstate compositions uniform modification of luminescent color has been achieved. Such modification is exemplified by surface crystallized glasses of composition A and B, and particularly composition A, in Table XI which developed a warm white luminescence, although spectroscopic examination revealed the presence of appreciable amounts of both blue and yellowish-red spectral components characteristic of the luminescent crystals obtained respectively with the calcium silicate glasses of Table II and the calcium tungstate glasses of Table IV. Glass D in Table XI is essentially a cadmium borate which would without tungstate crystallize to a bright red emitting cadmium borate phosphor. However, when glass of composition D was surface crystallized it luminesced with a warm white color.

In the preceding composition tables, the percent by weight of the various constituents is calculated from the materials used to make the respective batches, that is, the calculated metal or metal oxide content in each case actually refers to the metal or metal oxide content of the raw batch constituents and assumes that associated impurities and volatile constituents such as water and carbon dioxide, are eliminated. The foregoing glasses may accordingly be fabricated by mixing carbonates, borates, etc. of the various components which will decompose to the corresponding oxides during melting. For example, the calcium oxide content may be calculated from such raw mix constituents as calcium carbonate.

All of the glasses formed from the foregoing glass compositions were thermally surface crystallized by one or more of the following procedures or treatments, which, solely for purposes of designation herein, are indicated as "Flame," "Molten Salt," "Autoclave," "Isothermal," "Gradient" and "Ambient Heat Immersion." Although, these thermal surface crystallization procedures are described hereinafter in particular detail, it of course is to be understood that the procedures are merely by way of example and should not be considered as limiting the broad methods, products or concepts of the invention. Examples of such thermal crystallization procedures follow.

Flame

In accordance with one method of glass body surface crystallization according to this invention, direct flame heat treatment of the glass surface of the body or article to be surface crystallized is employed. Such flame treatment can be carried out by directing a gas-air, gas-oxygen or acetylene-oxygen flame directly onto the surface of the glass and moving the flame in uniform fashion over the surface to obtain uniform surface heating. Of course, such uniformity can also be effectively obtained by the alternative method of moving the glass across a stationary flame rather than moving the flame relative to the glass body. Continued movement of the flame relative to the glass body can be carried on until by visual observation it is determined that the proper depth and degree of crystallization has been obtained. Glass articles of diopside glass having composition A of Table X were preheated to 1400° F. on a refractory setter and then uniformly surface heated with a gas-oxygen flame until a uniform layer of translucent crystals was developed on the surface of the glass articles. Sections of these surface crystallized articles having a 5/16 inch thickness had an average light transparency for wave lengths in the visible range of the spectrum (400 millimicrons to 700 millimicrons) measuring between 8.5 and 9 percent.

As another example of thermal crystallization by this method, a glass article having the composition C-2 in Table I-A was placed on a refractory plate situated on the movable bed of a glass-working lathe and passed slowly through a stationary gas-oxygen flame for several cycles until a surface crystallinity of about 60 microns was obtained. Average transmission to visible light of a 5/16 inch thick section of the article was 3.5 percent.

The luminescence of the surface crystals which were developed showed a luminescent light output, as measured by a standard visible light meter of 18 units when the glass was irradiated with ultraviolet light.

The surface crystallized glass article also proved to be practical for measurement and detection of alpha and gamma ray radiations. For example, response to alpha rays using polonium 210 as an alpha ray source produced a scintillation count, as measured by a Nuclear-Chicago Model No. 186 detector coupled to a Nuclear Chicago Model No. 186 scalar, of 10,000 counts in 0.66 minute, whereas ordinary glass of the same thickness required a time expiration of 32.05 minutes to produce the same number of counts.

With the same measuring equipment but using a sodium isotope as a source of gamma radiations, the time for the production of 10,000 scintillations was reduced from 40.58 minutes for the comparable non-surface crystallized glass to 21.55 minutes for the surface crystallized glass.

The above surface crystallized glass was also found to be useful for the fabrication of cathode ray tube screens including specifically among others, a viewing screen for a television tube. For example, a viewing screen for image projection was prepared and was coated with transparent film of tin oxide. Cathode ray response from a cathode ray gun produced a televised image having a yellow coloration, the brightness of which was varied as a function of voltage and current density, as shown in Table XII, below.

TABLE XII

| Beam Voltage, kv. | Current Density, microamps/sq. inch | Light Output |
| --- | --- | --- |
| 30 | 50 | 55 |
|  | 40 | 50 |
|  | 30 | 42 |
|  | 20 | 35 |
|  | 10 | 22 |
|  | 5 | 13 |
| 25 | 50 | 42 |
|  | 40 | 37 |
|  | 30 | 32 |
|  | 20 | 25 |
|  | 10 | 16 |
|  | 5 | 9.5 |
| 18 | 50 | ---- |
|  | 40 | 22 |
|  | 30 | 19 |
|  | 20 | 14 |
|  | 10 | 9 |
|  | 5 | 5 |

*Molten salt*

A further method of accomplishing glass surface crystallization of luminescent crystals in accordance with this invention involves the treatment of a surface of the glass body with a molten salt bath, as by immersion therein. The salt bath can be a mixture containing 60 parts by weight of calcium chloride ($CaCl_2$) and 40 parts by weight of lithium chloride (LiCl). Such a mixture is a preferred one and will promote surface crystallization of all compositions set forth herein. The time interval for such immersion will ordinarily range from about 10 minutes to 60 minutes, depending on the particular glass composition being crystallized. The salt bath temperatures ordinarily should be maintained in the range between about 1000° F. and 1100° F. By use of this method, again dependent upon the particular glass composition being surface crystallized, surface crystallization either occurred during the molten salt bath treatment, or during subsequent heat treatments applied to the glass body subsequent to the removal of the glass body from the salt bath. In instances where surface crystallization does not occur during the molten salt treatment, it was found that the molten salt treatment facilitated subsequent surface crystallization procedures in that it promoted a reduction in the conditions of temperature and/or time necessary for surface crystallization. Such a treatment therefore is extremely advantageous for use with glass compositions which are difficult to surface crystallize at temperatures below the softening temperature of the glass, since such crystallization can be carried out at temperatures below the deformation temperature of the article and can be employed to surface crystallize pre-shaped or preformed articles without alteration of the desired configuration and dimensional characteristics of the article. Furthermore, even glasses which are otherwise difficult to surface crystallize can be formed to their desired final configuration prior to surface crystallization. Also, since the lowering of crystallization temperature occurs only at the surface of the glass body, less care need be exercised to selectively restrict crystal formation to the surface of the glass body. This, of course, is believed to result from the fact that the crystallization temperature of the interior of the glass body remains unaffected and is therefore higher, since the interior of the glass is not brought into contact with the molten salt.

In accordance with the above procedure, a salt mixture of the following composition was weighed out and heated to 100° F. in an alumina crucible.

|  | Gms. |
| --- | --- |
| LiCl | 21 |
| $CaCl.2H_2O$ | 14 |
| $MgCl.6H_2O$ | 3 |
| $MnCl.6H_2O$ | 1 |

A cathode ray tube face plate having a glass composition corresponding to composition B-2 in Table I-A was heated to 1100° F. face down. With the sides and the inner surface of the face plate serving as a container, the face plate was filled with molten salt. After one and one-half hours at 1100° F., the molten salt was poured out of the face plate and the face plate heated to 1180° F. and maintained at this temperature for two and one-half hours. After cooling, it was observed that a uniform luminescent layer of surface crystals 450 microns thick had developed on the salt treated surfaces only.

Another glass of the same composition was similarly treated with the exception that the face plate was maintained in contact with the molten salt for two hours and the subsequent heating was carried out at 1240° F. for three hours. The crystalline surface layer which was formed in this instance was 500 microns thick.

Still another face plate having the same composition was treated in a slightly modified manner. In this instance the face plate was heated for two hours at 1100° F. in contact with a molten salt which had the following composition.

|  | Gms. |
| --- | --- |
| $MnCl_2$ | 3 |
| $CaCl_2$ | 60 |
| LiCl | 40 |

The molten salt was then removed from the face plate and the latter was heated to 1240° F. for three hours. By this treatment, a luminescent layer of surface crystals was formed on the salt treated surface having a depth of 450 microns. The crystalline surface was thereafter aluminized by vaporizing aluminum directly onto the crystallized surface. Other than ordinary washing and drying no pretreatment of the crystallized surface was required to obtain exceptionally good deposition and adherence of the aluminum on the crystallized surface. The face plate was mounted, as with a conventional television face plate, at a 90° to the electron beam of a cathode ray gun and tested. Light output for the normal viewing side of the face plate, that is, from the surface opposite the cathode ray bombarded surface of the face plate was then determined for cathode ray bombardment at various current densities and beam voltages.

In another instance a face plate having a glass composition corresponding to D-1 in Table I-A was treated with a 60 gram $CaCl_2$-40 gram LiCl molten salt mixture at 1100° F. for 30 minutes. A crystalline surface was obtained which upon cooling fluoresced bright green when exposed to excitation by ultraviolet light. With nickel-filtered X-rays from a copper target bombarding the face plate it luminesced green.

In the preparation of a fluorescent lighting tube, a 1½ inch O.D. tubing is drawn from glass G-1 of Table I-B. Wall thickness is about 0.02 inch. Molten eutectic mixture of calcium chloride-lithium chloride is placed inside the preheated tube at about 1100° F., the tube plugged at each end and rotated in an oven while being heated at 1100° F. for thirty minutes. The salt was poured out and the tube heated for one hour at 1200° F. Then the tubing is cooled. The crystals on the surface are thin and semi-translucent. When fabricated in a conventional manner as a fluorescent lamp and energized, the light emitted by the ultraviolet ray excited phosphor is a warm yellow color.

As will be seen from the foregoing examples various compositions containing the lithium ion were employed. In this method of the invention it is only essential that the molten inorganic salt or salt mixture be one containing the lithium ion. Use of approximately the eutectic mixture is a preferred procedure merely because one conveniently obtains a relatively low melting mixture in this way. The method is effective using any other molten inorganic salt mixture containing the lithium ion, employing treatment temperatures from 900° F. up to within 50° F. of the fiber softening point of the glass being treated. Times of treatment are at least 10 minutes. Further heating in the foregoing temperature range after removal of the molten salt from the surface can be used to obtain a final surface crystallization, where necessary or desired.

*Autoclave*

According to another method the surface crystallization is effected by autoclaving at an elevated temperature and steam partial pressure above 15 p.s.i.a. In this method the physical contact of the steam in some manner promotes the preferential surface crystallization at a temperature lower than that at which the glass body would ordinarily undergo crystallization.

In general steam partial pressures are at least 25 p.s.i.a., more usually at least 500 p.s.i.a., and more generally from 1000 to 5500 p.s.i.a.

Temperatures are generally at least 500° F., depending on the glass properties. Generally temperatures are no higher than 50° F. below the fiber softening point.

Times of treatment depend, of course on the particular glass and the temperature employed, but are generally of the order from 5 minutes to 6 hours, more often from one-half hour to four hours.

A ¼ inch thick section of vitreous glass having the composition corresponding to D–1 in Table I–A was surface crystallized at 1050° F. under 5,500 p.s.i. steam pressure for two hours. As the glass was to be used as the viewing screen, or face plate, of a cathode ray tube, the crystals on one side of the screen, corresponding to the viewing side, were removed by a light grinding and polishing operation. The surface crystallized viewing screen had an average light transmittance of 3.5 percent in the visible portion of the spectrum. The crystallized surface was aluminized directly without any pretreatment of the surface being necessary. A cathode ray tube was fabricated from the viewing screen and was mounted with the viewing screen positioned at right angles to the electron beam. The light output transmitted through the thickness of the screen from the bombarded side of the screen was measured by measuring the visible light output from the non-bombarded or viewing side of the screen at different current densities and voltages. These results are shown in Table XIII, below.

TABLE XIII

| Beam Voltage, kv | Current Density, microamps/sq. inch | Light Output |
| --- | --- | --- |
| 30 | 178 | 300 |
|  | 133 | 250 |
|  | 89 | 180 |
|  | 44 | 100 |
|  | 17.8 | 40 |
|  | 8.9 | 5 |
| 25 | 178 | 240 |
|  | 133 | 190 |
|  | 89 | 140 |
|  | 44 | 70 |
|  | 17.8 | 41 |
|  | 8.9 | 19 |
| 18 | 160 | 150 |
|  | 133 | 130 |
|  | 89 | 95 |
|  | 44.5 | 67 |
|  | 17.8 | 30 |
| 10 | 71 | 36 |
|  | 44.5 | 30 |
|  | 17.8 | 14 |
|  | 8.9 | 9 |

Resistance to deterioration of the luminescent qualities of the screen when subjected to high current densities was determined by subjecting the luminescent surface crystals to continuous bombardment of 178 microamperes per square inch at 30 kv. Even after this level of current density the light output only dropped slowly in 70 minutes time to 93 percent of the original value and leveled out at this value.

By contrast a luminescent screen was made using the conventional method of settling a powdered commercial zinc silicate phosphor, commonly referred to as a P–1 phosphor, onto a glass plate from a water cushioning solution containing barium acetate and potassium silicate binders. This screen was settled on tin oxide coated "Electropane" sheet glass, with the phosphor coating weight being 10 milligrams per square centimeter. As contrasted to the aforementioned surface crystallized viewing screen, or face plate of the present invention, the settled powder screen underwent rapid deterioration even before the desired current density of 178 microamperes per square inch was attained. Therefore, the settled powdered screen was tested at a much lower current density of 5.6 microamperes per square inch and at a lower voltage of 25 kv. After a period of three and one-half hours, the output of the settled phosphor screen had dropped to 60 percent of its initial value and leveled out at this value.

*Isothermal*

In accordance with another method of this invention, many of the glass compositions of this invention were caused to undergo a glass surface phosphor crystallization by heating the glass body or article throughout and in a uniform manner for relatively lengthy periods of time and at temperatures below the softening temperature of the glass.

Representative isothermally heat treated surface luminescent zinc borate glasses selected from among those set forth in Tables VI–A, B and C were excited wtih 2537 Angstroms ultraviolet light and emitted yellowish light. One such zinc borate glass was isothermally heated for twenty four hours at 1175° F. and developed a luminescent crystalline surface layer having a depth of approximately 800 microns. Isothermal heat treatment of another similar zinc borate glass for twenty four hours at 1150° F. produced a luminescent surface layer having a depth of approximately 80 microns.

Zinc vanadate glasses having compositions selected from among those represented in Table VIII were also isothermally surface crystallized and developed luminescent surface crystals exhibiting bright yellow visible luminescence of about equal intensity when exposed to either long or short ultraviolet wave length excitation.

Isothermally surface crystallized lead-barium-silicate glasses having compositions set forth in Tables III–A, B and C developed very good luminescence. However, it has been found to be preferable to carry out the heat treatments at temperatures below about 1500° F. in order to avoid the development of beta $BaO.2SiO_2$ crystals (Sandbornite) the appearance of which is found to be associated with a diminution in luminescence.

A surface crystallized glass having composition A in Table III–A was compared to a luminescent phosphor prepared by sintering in the "dry" or powdered state according to the conventional methods for producing silicate phosphors and having the same crystalline identity as the surface crystals of the surface crystallized glass, as shown by X-ray identification wherein the X-ray diffraction peaks of the sintered powder and the crystallized glass were compared and were found to have the same peaks in the same relative intensity. Samples of sintered phosphors were prepared from identical batch ingredients as the glass A, using identical ratios of components. Sintering of individual samples was at each of three different sintering temperatures, viz. 1380° F., 1600° F., and 2000° F. for twenty four hours. Likewise, the surface crystallized glass was melted to a colorless, transparent glass and then surface crystallized at the same temperatures for the same length of time. Both the "dry" powder, sintered at 1380° F., and the glass, surface crystallized at 1380° F., were luminescent. Also, both the sintered powders and the glass, when heated at 1600° F. and 2000° F.

had negligible luminescence. However, a comparison of the luminescent efficiency of the phosphor prepared by sintering at 1380° F., and the glass surface crystallized at 1380° F., revealed a substantial disparity in light output, as shown Table XIV, below.

TABLE XIV

Luminescent output with 2537° excitation

Sintered powder 1380° F. 24 hours _____ 2.5
Surface crystallized glass 1380° F. 24 hours _____ 15.0

Visible light measurements were made on representative isothermally surface crystallized wollastonite glasses having compositions from Tables II–A, B and C. Composition A from Table II–A was typical and when isothermally heated for 2 minutes at 1800° F. developed a crystalline phosphor surface layer having a depth of about 800 microns. Another glass of the same composition, when isothermally heated for 35 minutes at 1600° F., developed a phosphor surface layer of 400 microns depth. Under ultraviolet light exposure both glasses emitted a visible warm light. Another typical wollastonite glass having composition O, as set forth in Table II–B, was isothermally heated for three hours at 1700° F. and exhibited a visible warm white light.

Several of the cadmium borate glasses exemplified by the compositions shown in Table V were surface crystallized by the isothermal heat treatment method discussed above. Thereafter these surface crystallized glasses were excited with various types of irradiation, such as ultra violet rays, X-rays and cathode rays and in each instance emitted visible luminescence. A glass corresponding to composition G in Table V when isothermally heat treated for three hours at 1075° F. developed a uniform crystalline phosphor surface layer having a depth of approximately 40 microns; by contrast, when the same glass composition was isothermally heat treated for six hours at 1075° F., and thereafter further isothermally heat treated for eight hours at 1100° F. it also developed a uniform crystalline phosphor surface layer but which measured approximately 60 microns in depth; and by further contrast when isothermally heat treated at 1075° F. for seven hours developed a uniform crystalline depth of approximately 50 microns.

Diopside glasses having compositions A and B of Table X were isothermally heat treated at various temperatures and for different time intervals, as shown below in Table XV. These glasses, as a result of such heat treatments, developed transparent surface crystals which, when activated by X-rays, were visibly luminescent and emitted luminescent light having a blue coloration. X-ray diffraction identification of the surface crystals corresponding to each composition and the isothermal heat treatment to which it was subjected is also set forth in Table XV.

TABLE XV

| Composition | Temp., ° F. | Time | Surface Crystals |
| --- | --- | --- | --- |
| A | 1,600 | 4½ hrs | Diopside. |
| A | 1,700 | 4 hrs | Diopside plus calcium aluminate. |
| B | 1,800 | 2 hrs | Diopside. |

*Gradient*

The results obtained with glass having composition G–1 of Table I–B are typical of those obtained with the gradient heat treatment surface crystallization method of this invention. The method is to provide a heat sink to withdraw heat from the portions of the glass which are desired to be kept vitreous while concurrently heating other selected surface portions of the glass to crystallization temperatures.

In one instance, a glass disc having the above G–1 glass composition was placed upon a rotating cast iron mold which functioned as a heat sink. One selected surface portion of the disc was then heated with a radiant burner to a temperature of 1250° F. After several hours of heating, the heated surface of the glass disc crystallized. The surface crystallized portion was found to be responsive to excitation by ultraviolet light, X-rays, and gamma rays. It was also found that the surface crystallized portions of the glass possessed extremely good chemical durability and were quite resistant to chemical attack by strongly acidic solutions.

The method of thermal gradient heat treatment outlined here has the added advantage that high surface crystallization temperatures may be attained without deformation. Hence, an article may be formed prior to being surface crystallized by this method.

*Ambient heat immersion*

One method of this invention successfully utilized in producing luminescent glass surface crystallization involves the placement or immersion of a body of the solidified vitreous glass into a furnace which has been uniformly preheated to the predetermined crystallization temperature of the glass. The glass body is then heated within the furnace at the desired crystallization temperature, which, depending upon the particular glass composition being crystallized ordinarily varies from 1075° F. to 1800° F. until the desired depth of surface crystallization has been obtained. Thereafter, the glass body is removed from the furnace and permitted to cool at or near room temperature. Alternatively the glass body may be permitted to undergo a gradual cooling to room temperature by leaving the body insulated within the furnace and terminating the heating. In some instances it has also been found to be desirable to carry out such ambient heat immersion treatments by heating the glass body successively for short intervals followed by successive intervals of cooling rather than carrying out the entire surface crystallization in one immersion heat treatment. As a result of this type of heat treatment, it has been found that the interior portions of the glass, as a consequence of the sudden cooling, are prevented from conducting sufficient heat from the surface of the glass to cause viscous flow or deformation of the glass body. A single short time crystallization cycle, such as a three minute time interval, enables surface crystallization to take place above the softening point of the glass without deformation of the glass since sufficient heat transmission to the interior of the glass article does not occur during the course of such a limited heat immersion. On the other hand if a longer time of heat treatment is required to get optimum surface crystallization the surface crystals which form initially prevent deformation of the article. Although, the exact reasoning is not fully understood, it is believed that the rapid rate of heating through the nucleation temperature prevents crystallization of the interior of the glass. Consequently, the glass body may be shaped and formed prior to such heat treatment and attendant surface crystallization without alteration of the configuration and dimensional characteristics of the glass body. Thermal gradient tests with a glass rod having the same composition, of course, can be conducted according to well known procedures to determine the optimum immersion temperature or temperatures for any given glass.

The following data show times, temperatures, luminescent brightness, depth of crystallization and transparency of various glasses surface crystallized by the ambient heat immersion methods of this invention. An important result of this method of heat treatment is that transparent luminescent phosphors can be formed such that the combination of parent glass and the phosphor layer often have transparencies of the order of 60 or more. Thus, images formed upon these surfaces by exciting radiation such as cathode rays are subjected to a minimum loss of resolution and contrast.

IMMERSION HEAT TREATMENTS.—GLASS C-2, TABLE I-A

| Temp., °F. | Time, min. | Over-all Sample Thickness, in | Crystal Depth (microns) Each Surface | Brightness | Percent Transparency | | |
|---|---|---|---|---|---|---|---|
| | | | | | 4,000 A. | 7,000 A. | Avg. |
| 1,440 | 30 | .050 | 100 | 19 | 5.5 | 18.0 | 9.0 |
| 1,440 | 20 | .050 | Approx. 40 | 5 | 43.0 | 74.5 | 62.0 |
| 1,440* | 45 | 0.50 | 80 | 11.0 | 7.0 | 32.0 | 17.0 |

* In 5 and 10 minutes heating cycles with cooling between.

GLASS F, TABLE V

| | |
|---|---|
| Temp., °F. | 1200 |
| Time, min. | 5 |
| Over-all Sample Thickness, in. | .050 |
| Crystal Depth (Microns) Each Surface | 160 |
| Brightness | 1.0 |

Accordingly, irrespective of which of the various surface crystallization methods, and which of the various glass compositions which may be employed in the practice of this invention, there is obtained a glass having a surface luminescent layer which is replete with advantages over many of the phosphors, phosphor screens, luminescent glasses, and the like, heretofore known in the art.

The depth of the semi-crystalline layer of the products of this invention can be varied according to the use of the article. Where the activation of the crystalline layer and the viewing of the resulting luminescence are from the same side, the layer can be, say, up to 0.3 inch thick. On the other hand, the layer can be considerably less than ten microns. Generally however, the transparent glassy layer is at least as thick as the crystalline layer. In many articles according to the invention, such as cathode ray tube face plates, fluorescent lamps, etc., the thickness of the crystalline layer is usually less than 500 microns, more often less than 100 microns.

Another salient feature of this invention is that certain host crystals can be developed by in situ transformation of the glass constituents. Also, since the phosphor crystals are embedded within the glass matrix and, as a result, have substantially complete physical contact with the glass matrix, the phosphor crystals are able to dissipate heat which is emitted during excitation both through conduction and radiation. Such increased heat dissipation results in a higher light output resulting from the higher current density which can be applied to the phosphors without phosphor deterioration and by increasing the point of current saturation to a higher level more commensurate with the theoretical level of current saturation for the particular phosphor to be utilized. Still further, it is possible to obtain a high light output together with improved area and detail contrast due to the diminution of interfacial reflection and high visual transparency of the glass matrix.

Because of the in situ method of formation of the semi-crystalline layer, according to this invention, the semi-crystalline layer is essentially non-porous. This is because the crystals are formed from the surface portion of the non-porous glass body and are thus dispersed or embedded in the glass matrix which is the residue glass remaining after the in situ crystallization has been effected. Moreover, the partly crystalline surface layer is in essentially perfect physical contact with the underlying glass of the body, as will be understood.

I claim:

1. A glass body having an integral surface layer comprising inorganic crystals, said crystals being formed by in situ crystallization from a surface portion of the glass of said body, said glass consisting essentially of inorganic constituents, said crystals of said layer being dispersed in a glassy matrix which consists essentially of the uncrystallized portion of said surface portion of glass of said body, said crystals in said integral surface layer containing an activator rendering said crystals luminescent, said body other than said integral surface layer being an essentially vitreous, noncrystalline body of glass.

2. In a cathode ray tube envelope having a face plate containing a cathodoluminescent phosphor for viewing information, the improvement which resides in the face plate being an essentially transparent face plate of glass consisting essentially of inorganic constituents, said face plate having integral therewith an inner surface layer of a multiplicity of inorganic crystals dispersed in a glassy matrix, said crystals being formed by crystallization in situ from the inner surface portion of the glass of said face plate, said glassy matrix consisting essentially of the uncrystallized residue of glass of said inner surface portion, said layer containing said dispersed crystals also containing an activator rendering said dispersed crystals cathodoluminescent, said glass face plate other than said integral surface layer being an essentially vitreous noncrystalline body of glass.

3. A method of making a glass body having an integral surface layer comprising inorganic luminescent crystals, which comprises the steps of (1) shaping a glass melt to form a glass body of a desired shape, said glass body consisting essentially of inorganic constituents and being capable of partial thermal in situ crystallization to yield a multiplicity of luminescent crystals dispersed in a glassy matrix, and (2) partially thermally crystallizing in situ at least one surface layer of said body without crystallizing the underlying portions of said glass body, and thereby forming a surface layer comprising a multiplicity of inorganic luminescent crystals dispersed in a glassy matrix, said glassy matrix consisting essentially of the residue of said glass of said surface layer after said crystallization step.

4. A glass body according to claim 1 wherein the glass is essentially 54.8 weight percent $SiO_2$, 26.4 weight percent ZnO, 0.37 weight percent MnO, 4.98 weight percent $Na_2O$, 4.98 weight percent NaF, 4.5 weight percent $SnO_2$ and 4 weight percent $Al_2O_3$, and the inorganic luminescent crystals comprise willemite.

5. An article of glass consisting essentially of transparent glass and having at least one integral and essentially non-porous surface layer comprising a multiplicity of luminescent crystals dispersed in a glassy matrix and formed in situ within the surface of said glass, the glass of said article other than said integral surface layer being an essentially vitreous, noncrystalline body of glass.

6. A method according to claim 3 wherein said step of thermally crystallizing is effected by steam autoclaving said glass body in a steam atmosphere of over 25 p.s.i.a. steam partial pressure at a temperature from 500° F. to no higher than 50° F. below the fiber softening point of the glass until a desired surface crystallization has been effected.

7. A glass body of claim 1 in the form of tubing suitable for a fluorescent lamp, wherein at least the inside surface layer of the tubing is said integral surface layer comprising inorganic crystals.

8. A luminescent article comprising a non-luminescent vitreous layer and a luminescent semi-crystalline outgrowth of said vitreous layer forming a luminescent surface layer on and integral with said article, said vitreous layer being essentially entirely vitreous and crystal-free.

9. A method according to claim 3 wherein said step of thermally crystallizing includes thermally treating said surface of said body while in contact with a molten salt bath containing the lithium ion, thereby increasing the tendency toward thermal crystallization of said luminescent crystals in said surface.

10. A glass body having an integral surface layer comprising luminescent willemite crystals, said crystals being formed by in situ crystallization from a surface portion of the glass of said body, said glass consisting essentially of inorganic constituents, said crystals of said layer being dispersed in a glassy matrix which consists essentially of the uncrystallized portion of said surface portion of glass of said body, said crystals in said integral surface layer containing an activator rendering said crystals luminescent, said crystals of said body being essentially solely in said integral surface layer.

References Cited by the Examiner

UNITED STATES PATENTS

| | | | |
|---|---|---|---|
| 2,049,765 | 8/1936 | Fischer | 252—301.4 |
| 2,097,275 | 10/1937 | Fischer | 252—301.4 |
| 2,099,602 | 11/1937 | Fischer | 252—301.4 |
| 2,219,895 | 10/1940 | Hanlein | 252—301.4 |
| 2,273,778 | 2/1942 | Berthold | 65—111 |
| 2,523,026 | 9/1950 | Jones | 252—301.4 |
| 2,722,519 | 11/1955 | Otley | 252—408 |
| 2,752,521 | 6/1956 | Ivey | 252—301.4 |
| 2,779,136 | 1/1957 | Hood et al. | 65—30 |
| 2,901,364 | 8/1959 | Pincus | 106—47 |
| 2,920,972 | 1/1960 | Gordon | 106—47 |
| 2,939,797 | 6/1960 | Rindone | 106—47 |
| 2,958,604 | 11/1960 | George | 106—52 |
| 2,960,801 | 11/1960 | King et al. | 65—33 |
| 2,960,802 | 11/1960 | Voss | 65—33 |
| 2,961,328 | 11/1960 | Babcock et al. | 106—52 |
| 2,980,547 | 4/1961 | D'Adrian | 106—47 |
| 2,998,675 | 9/1961 | Olcott et al. | 106—39 |
| 2,999,819 | 9/1961 | Blair | 252—408 |

OTHER REFERENCES

DeMent-Fluorochemistry-Chemical Pub. Co., Brooklyn, New York, 1945, page 470.

Hinz, "Viterokem," Chem. Abstracts, volume 53, July 10, 1959, page 12, 615c, d, e and F.

Morey, The Properties of Glass, 2nd edition, Reinhold Pub. Co., New York, 1954, page 68.

TOBIAS E. LEVOW, *Primary Examiner.*

DONALL H. SYLVESTER, MAURICE A. BRINDISI,
*Examiners.*

R. D. EDMONDS, *Assistant Examiner.*